US011611439B2

(12) United States Patent
Ansel et al.

(10) Patent No.: US 11,611,439 B2
(45) Date of Patent: Mar. 21, 2023

(54) TREE STRUCTURE FOR BYZANTINE FAULT TOLERANCE

(71) Applicant: CELO FOUNDATION, San Francisco, CA (US)

(72) Inventors: Jason Ansel, Mountain View, CA (US); Marek Olszewski, San Francisco, CA (US)

(73) Assignee: CELO FOUNDATION, San Francisco, CA (US)

( * ) Notice: Subject to any disclaimer, the term of this patent is extended or adjusted under 35 U.S.C. 154(b) by 260 days.

(21) Appl. No.: 16/899,065

(22) Filed: Jun. 11, 2020

(65) Prior Publication Data
US 2020/0396081 A1 Dec. 17, 2020

Related U.S. Application Data

(60) Provisional application No. 62/859,717, filed on Jun. 11, 2019.

(51) Int. Cl.
*H04L 9/32* (2006.01)
*G06F 11/20* (2006.01)
(Continued)

(52) U.S. Cl.
CPC ........ *H04L 9/3236* (2013.01); *G06F 11/0751* (2013.01); *G06F 11/2097* (2013.01);
(Continued)

(58) Field of Classification Search
CPC . H04L 9/3236; H04L 9/3247; H04L 67/1097; H04L 9/50; H04L 9/3239; G06F 11/0751; G06F 2201/82
See application file for complete search history.

(56) References Cited

U.S. PATENT DOCUMENTS 10,616,324 B1 * 4/2020 Kaddoura ............. A61F 2/4465
10,848,549 B1 * 11/2020 Rizvi ...................... H04L 67/01
(Continued)

OTHER PUBLICATIONS

Long et al.; Scalable BFT Consensus Mechanism Through Aggregated Signature Gossip; 2019; retrieved from the Internet https://ieeexplore.ieee.org/abstract/document/8751327; pp. 1-8, as printed. (Year: 2019).*

(Continued)

*Primary Examiner* — Michael W Chao
(74) *Attorney, Agent, or Firm* — Butzel Long

(57) ABSTRACT

Systems and techniques are provided for a tree structure for byzantine fault tolerance. A validator computing device may receive a candidate block from a block producer. The block producer may be a second validator computing device of the distributed network. The validator computing device may determine whether or not the candidate block is valid. The validator computing device may sign an indication of whether or not the candidate block is valid to generate a signature. The validator computing device may send the signature to a third validator computing device that is a sibling node to the validator computing device. The validator computing device may receive a second signature from the third validator computing device. The validator computing device may combine the signature and the second signature to generate a combine signature if the signature and the second signature agree.

16 Claims, 11 Drawing Sheets

(51) Int. Cl.
*H04L 67/1097* (2022.01)
*G06F 11/07* (2006.01)
*H04L 9/00* (2022.01)

(52) U.S. Cl.
CPC ........ *H04L 9/3247* (2013.01); *H04L 67/1097* (2013.01); *G06F 2201/82* (2013.01); *H04L 9/50* (2022.05)

(56) References Cited

U.S. PATENT DOCUMENTS

| | | | |
|---|---|---|---|
| 11,386,050 B2* | 7/2022 | Mahajan | H04L 9/3247 |
| 11,431,561 B2* | 8/2022 | Smith | H04L 69/22 |
| 11,475,150 B2* | 10/2022 | Baird, III | G06F 16/2365 |
| 11,475,422 B2* | 10/2022 | Ramasamy | H04L 67/12 |
| 2015/0332283 A1* | 11/2015 | Witchey | G06Q 10/10 |
| | | | 705/3 |
| 2018/0096042 A1* | 4/2018 | Kuzma | H04L 9/3236 |
| 2018/0359096 A1* | 12/2018 | Ford | G06Q 20/29 |
| 2020/0034456 A1* | 1/2020 | Montgomery-Recht | |
| | | | H04L 63/08 |
| 2022/0138062 A1* | 5/2022 | Abraham | G06F 11/2028 |
| | | | 714/4.11 |
| 2022/0182368 A1* | 6/2022 | Madisetti | G06Q 20/3829 |

OTHER PUBLICATIONS

Chander et al.; A Fault Resilient Consensus Protocol for Large Permissioned Blockchain Networks; 2019; retrieved from the Internet https://ieeexplore.ieee.org/abstract/document/8751439; pp. 1-5, as printed. (Year: 2019).*

* cited by examiner

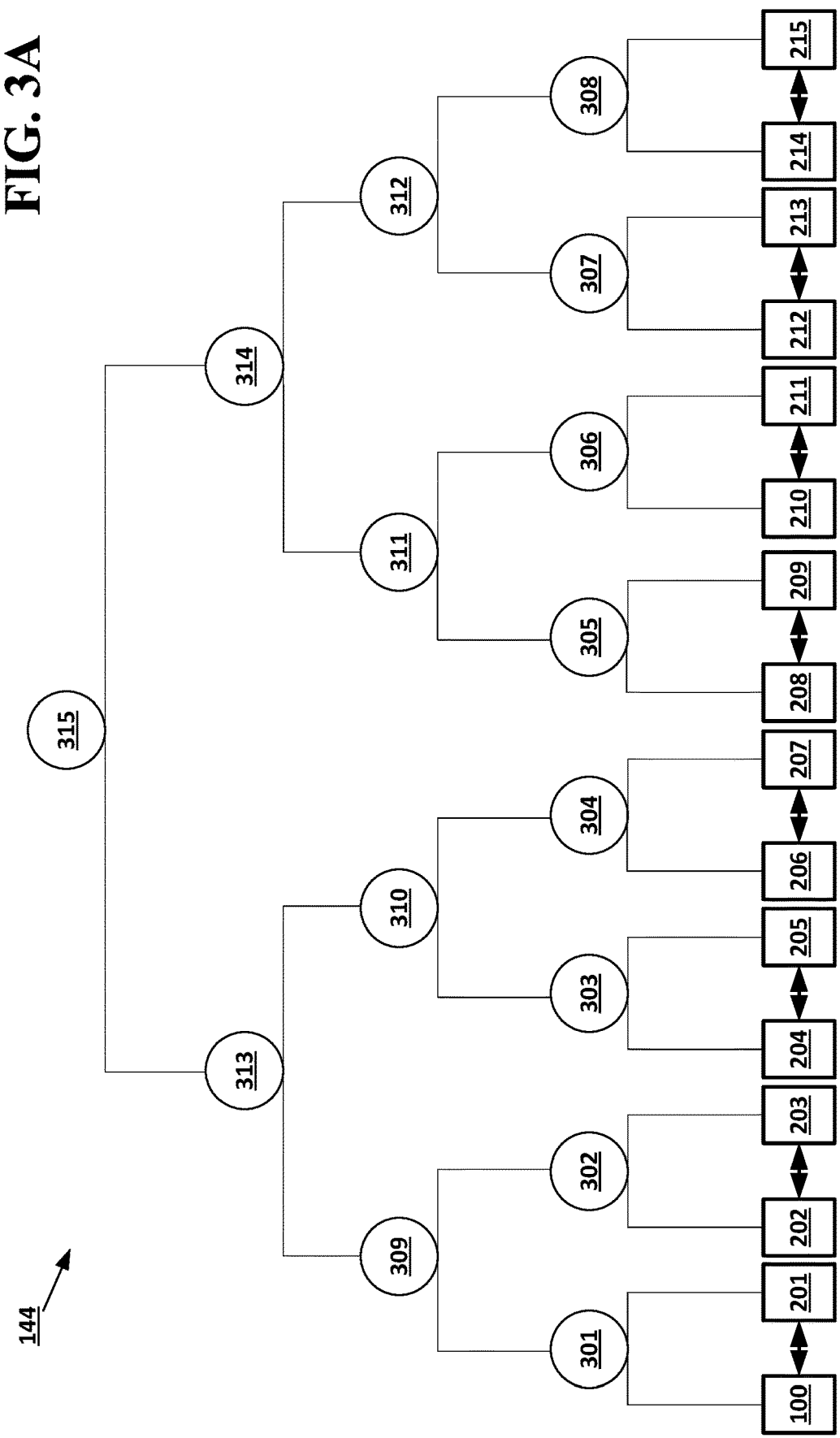

TREE STRUCTURE FOR BYZANTINE FAULT TOLERANCE

BACKGROUND

Byzantine Fault Tolerance (BFT) algorithms may be used in determining consensus in proof-of-stake implementations of distributed networks. BFT algorithms may guarantee that either all of the nodes in a distributed network will accept a block added to a blockchain, or none of the nodes will accept the block, reducing forking of the blockchain or the need to rollback changes to the blockchain. However, BFT algorithms may not scale efficiently, making them less useful for distributed networks with larger numbers of nodes. BFT algorithms may use all-to-all communication among nodes, requiring close to $O(n^2)$ messages to be sent between nodes even in non-naïve implementations. As the number of nodes reaches the thousands, the number of messages needed may be in the millions, bottlenecking the BFT algorithm. Distributed networks may use two-class systems, where some nodes of a distributed network are validators that participate in the BFT algorithm to form consensus while the other nodes of the distribute network observer but do not participate in forming consensus in order to reduce the number of messages needed to achieve consensus. However, this two-class systems may create additional complications in the governance of a distributed network, and often lead to implementation of incentivized delegation schemes.

BRIEF SUMMARY

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 3A shows an example arrangement suitable for a tree structure for byzantine fault tolerance according to an implementation of the disclosed subject matter.

DETAILED DESCRIPTION

Figure 1:
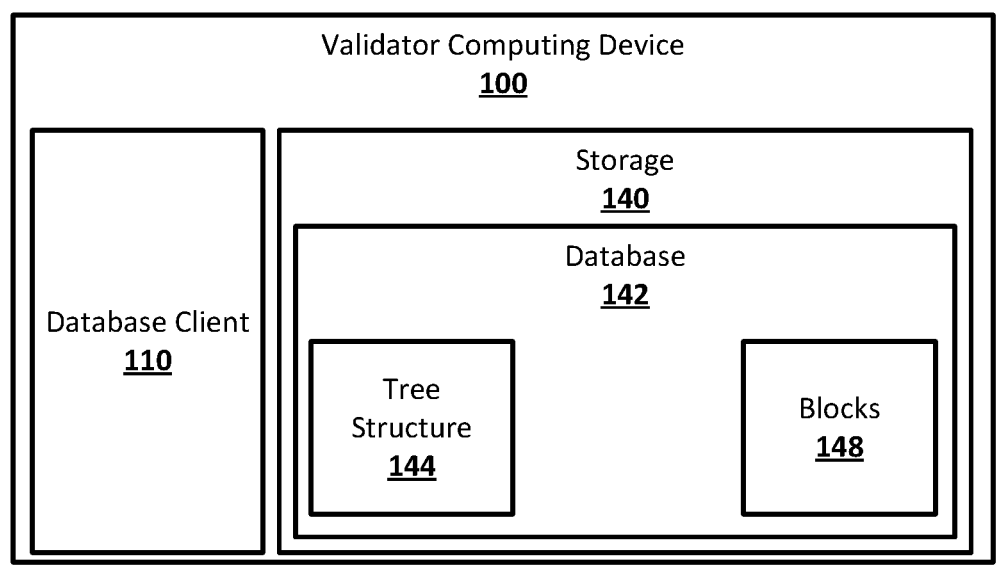
FIG. 1 shows an example system suitable for a tree structure for byzantine fault tolerance according to an implementation of the disclosed subject matter.

A tree structure for Byzantine Fault Tolerance may allow for the forming of consensus in a distributed network even as the number of nodes in the network increases without requiring a two-class system where a subset of nodes act as validators. If a subset of nodes are used as validator nodes in a distributed network that uses a tree structure for BFT, for example, due to bottlenecks such as the size of the blocks, the number of validators may be increased as the BFT consensus may no longer be a bottleneck. Nodes acting as validator nodes in a distributed network may be arranged into a dynamically constructed tree structure for communication when reaching consensus on validating a block. This may allow aggregation of the tree in $O(\log(n))$ parallel steps in the best case. The size of the messages sent between validator nodes may be fixed in the best case, and in the general case may require 1 bit per validator node, and signatures may be combined in a distributed manner as the signatures work their way up the tree. Nodes at the bottom layer of the tree structure may represent validator nodes in the distributed network, which may each be, for example, computing devices or systems that participate in the distributed network and store a copy of the decentralized database of the distributed network. Nodes at higher layers may act as virtual validators. Unanimous consent may be needed among the validator nodes in the tree to form a consensus. If there is disagreement among the nodes in the tree or a node is offline at any branch in the tree, the tree may be split into two subtrees at the node that is offline or disagrees with the other node with which it shares a parent. The two subtrees may operate independently as virtual validator nodes. At the end of tree consolidation, there may be small number of virtual validator nodes each representing a larger subtree of validator nodes and virtual validator nodes. This set of virtual validator nodes may then run an existing algorithm for BFT to arrive at a final consensus.

This tree structure for BFT may result in a best case of $O(\log(n)^2)$ steps per block or with $O(\log(n))$ broadcasts. Byzantine nodes, which may be nodes that are faulty, compromised, or otherwise malicious, positioned strategically throughout the tree structure may be able to cause problems and slow down validation. To prevent this, the tree structure for BFT may position validator nodes within the tree structure based on trust in and past reliability of the validator node. This may be based on how often a validator node has not been part of the consensus in the recent past, and how often a validator node failed to combine its signature with the other child node of its parent node in the tree structure. The leftmost validator node in the tree may be the most reliable validator node with the longest history of good behavior, for example, being part of the consensus, while the rightmost validator nodes may be validator nodes with recent failures to join the consensus. This may result in the tree being loosely sorted by trust and reliability. A Byzantine node may be able to slow down the validation of a single block, but may only be able to do this once, as the failure to join the consensus may result in the Byzantine node being repositioned in the tree structure. The Byzantine node may lose the power to repeat slowing down the validation of a node, or attempting to validate in any valid node, due to its repositioning within the tree. If the validator nodes in a distributed network include a fixed set of Byzantine nodes that make up less than ⅓rd of the total number of validator nodes in the distributed network, eventually each of them will act in a Byzantine way and be repositioned, resulting in the leftmost two thirds of the tree including only correctly operating validator nodes. This may result in the best-case number of steps per block for every subsequent block regardless of the behavior of the Byzantine nodes.

The tree structure for BFT may use a signature algorithm that supports the combination of both signatures and public keys into aggregate signatures and public keys that use the same space as a single signature. The signature algorithm may use the methods:

keygen( )=>pk1, secret1
sign(message, secret1)=>sig1
verify(message, pk1, sig1)=>boolean
combine_public key(pk1, pk2)=>pk3
combine_signature(sig1, sig2)=>sig3

The signature scheme may have the property that: verify (message, combine_public key(pk1, pk2), combine_signature(sig1, sig2))==True. This may imply that verify (message, pk1, sig1) is True and verify(message, pk2, sig2)==True. If either is false, the combined verification may fail. This property may be applied recursively to combine an arbitrary number of signatures into a single signature. The signature scheme used by the tree structure for BFT may be, for example, a Boneh-Lynn-Shacham (BLS) signature scheme.

An underlying, less scalable, BFT algorithm may be used by the tree structure for BFT, and may be called at the end of validation with the top nodes of the subtrees of the tree structure that are created by a disagreement or offline nodes and that act as virtual validator nodes, including actual validator nodes when there is a disagreement among right and left validator nodes at the bottom layer of the tree structure. This underlying BFT algorithm may support weighted votes, so that votes of the virtual validator nodes may be weighted by the total stake of their subtrees, and may allow the set of virtual validator nodes to change over time. For example, the HotStuff BFT algorithm may be modified to have these properties, although any other suitable BFT algorithm modified in any suitable manner may be used. HotStuff BFT may only require a single vote counting phase. Other BFT algorithms, such as, for example, pBFT, may need to run the vote counting process multiple times for each phase in the BFT algorithm.

To make forward progress, and arrive at consensus, at least ⅔rds+1 of the validator nodes in the tree structure may need to be both correctly behaving, for example, non-Byzantine, and have a bounded maximum network latency for point to point communication between validator nodes. If this property is violated, the progress towards the validation of blocks may be halted, resulting in no valid blocks being validated to be added to the decentralized database, for example, blockchain, until the network is restored. This network latency upper bound may be set dynamically so that it may be increased when consensus is not reached and decreased when consensus is reached quickly. The tree structure for BFT may operate with an $O(\log(n))$ broadcast operation. Point to point communications between validator nodes may be validated.

Using the tree structure for BFT may proceed in multiple phases. In an initialization phase, which may be, for example, phase 0, a validator node that is a block producer may generate a candidate block and broadcast that block along with a signed tuple of: block_info=(block_hash, prior_block_depth, current_block_depth) to all of the validator nodes of the distributed network. The block producer may be a validator node of the distributed network chosen through an algorithm such as weighted round robin. The candidate block may be candidate to be added to a blockchain database stored using the distributed network. Each validator nodes of the distributed network, which may be part of the tree structure for BFT, may validate the block to determine whether the block is valid and whether the depths and signatures of the validator node that it block producer are valid. This may be done according to the rules of a standard BFT algorithm, such as, for example, HotStuff BFT. If a validator node determines that the block is valid, and the depths and signatures of the block producer are valid, the validator node may sign block_info for the block, indicating that the validator node votes yes to validation of the block. Otherwise, the validator node may sign (null, current_block_depth), indicating that the validator node votes no to the validation of the block.

Following the initialization phase, or phase 0, there may be a number of phases equal to the ceiling of $\log(n)$ where n is the number of validator nodes in the tree structure for BFT. These may be phases 1 through $\mathrm{ceil}(\log(n))$. In these phases, each validator node and virtual validator node of the tree structure at each level in ascending order may communicate with their neighboring validator node or virtual validator node, for example, node with the same immediate parent node, to check if they are in agreement on the validity of the block. Signatures that agree may be shared and combined and the left node of two agreeing branches of the same parent may operate the virtual validator node one level up in the tree, which may be, for example, the parent of the agreeing branches. Disagreeing nodes, or the topmost node for a subtree, may forward (block_info, signature, first_index, last_index) to the validator node that is the block producer, where first_index and last_index may represent the range of the subtree the signature includes.

After phase $\mathrm{ceil}(\log(n))$, there may be phases $\mathrm{ceil}(\log(n))+1$ to $2*\mathrm{ceil}(\log(n))$. In each of these phases, the validator node that is the block producer may broadcast the partial signatures it has received to that point. Each of these broadcasts may include a single signature, which may be an aggregated signature of all the signatures received to that point, and a list of ranges indicating the subtrees of the tree structure that are included in the signature. Each of these phases may represent a level of the tree structure in descending order. Each right node, including validator nodes and virtual validator nodes, of the tree structure may check the work of its corresponding left node of the tree structure with which it agreed in the previous phases to ensure that their combined signature is included in the signatures and ranges broadcast by the validator node that is the block producer. If a right node does not find its combined signature in the broadcast signatures and ranges, the right node may forward (block_info, signature, first_index, last_index) to the validator node that is the block producer.

In the final phase, phase $2*\text{ceil}(\log(n))+1$, the validator node that is the block producer may count the votes from the validator nodes in the tree structure based on the received signatures. If there are enough votes in favor of validating the block, the block and the signatures may be broadcast to the distributed network for inclusion in the decentralized database, for example, the blockchain database.

To participate in the tree structure for BFT, each validator node, for example, node at the bottom of the tree structure that corresponds to a computing device or system of the distributed network, may run the following algorithm, with inputs that may a secret key of the current node, current_block_depth, and an index in the tree structure.

A candidate block may be received from the validator note that is the block producer according to:
   block_info candidate=receive from block_producer( )
   (block_hash, prior_block_depth, current_block_depth)=block_info_candidate The block info candidate may be verified, for example, using HotStuff BFT and chain rules:

```
        If verify (block_info_candidate,...)
            block_info = block_info_candidate
        else:
            block_info = (None, current_block_depth)
        signature = sign(block_info, secret)
        start_index = index
        end_index = index
        my_level = TREE_DEPTH
```

The signature of siblings validator nodes in the tree structure may be combined into an aggregated signature, and once the top of the tree structure has been reached, the aggregated signature may be sent to the validator node that is the block producer:
for level_from_bottom in range(TREE_DEPTH):

```
if level_from_bottom == TREE_DEPTH-1:
    send_to_block_producer(block_info, start_index, end_index, signature)
    me_level = level_from_bottom
    break
```

The current node may be checked to determine if it is a virtual node at the current level in the tree structure, and if it is, it may be aggregated with its sibling node:
   if (index % 2**(level_from_bottom+1))==0:
   sibling_index=index+2**level_from_bottom
The current node my share block info with its sibling node at the current level in the tree structure:
   (block_info2, start_index2, end_index2, signature2)=receive_from_node(sibling_index)
   send_to_node(sibling_index, block_info, start_index, end_index, signature)
Whether the sibling nodes agree on validation of the block may be determined. If they do not agree, the current node may send a message to the validate node that is the block producer:

```
if verify_peer(sibling_index, block_info2, start_index2, end_index2,
signature2, ...):
    end_index = end_index2
    signature = combine_signatures(signature, signature2)
```

```
else:
    send_to_block_producer(block_info, start_index, end_index, signature)
    my_level = level_from_bottom
    break
```

If the current node is not virtual node, its signature may be aggregated with the signature of its sibling node, but the algorithm may not continue up the tree:
else:
   sibling_index=index-2**level_from_bottom
The current node may share block_info with its sibling node at the current level of the tree:
   send_to_node(sibling_index, block_info, start_index, end_index, signature)
   (block_info2, start_index2, end_index2, signature2)=receive_from_node(sibling_index)
If the sibling node and the current node at the current level don't agree on whether the candidate block is valid, the current node may send a message directly to the validator node that is the block producer:

```
if verify_peer(sibling_index, block_info2, start_index2, end_index2,
signature2, ...):
    else:
        send_to_block_producer(block_info, start_index, end_index, signature)
    my_level = level_from_bottom
    break
```

The current node may check that its signature has made it into the candidate block, and, if the signature has not made it into the candidate block, the current node may send the signature directly to the validator node that is the block producer:

```
for level_from_bottom in reversed(range(TREE_DEPTH)):
    if my_level >= level_from_bottom:
        (block_info2, signature2, ranges) =
            receive_broadcast_from_block_producer( )
        if not ranges_contains(index, ranges) and block_info == block_info2:
            send_to_block_producer(block_info, start_index, end_index,
                signature)
        else:
            break
        final_block = receive_final_block_broadcast_from_block_producer
            ( )
```

Each send and receive operation may verify the identity of the sender with a signature and may have a timeout based on the current phase of the algorithm. For example, the fifth possible receive should timeout at time $5*k$ after the algorithm begins, where k is a timeout scaling factor allocated to each point to point communication. Timed out receives may return null and fail validation. Each broadcast may be allocated a timeout of $k*\log(n)$. Timeouts in loop phases skipped with conditions or breaks may be counted. The cumulative timeouts of the first loop may be $k*\text{TREE\_DEPTH}$ and the cumulative timeouts of the second loop may be $k*\log(n)*\text{TREE\_DEPTH}$. The timeout scaling factor, k, may be set dynamically from block to block. Failed consensus may result in increasing k by a scaling factor, up to some hard maximum, and especially fast consensus may result in decreasing k by a scaling factor.

The validator node that is the block producer may run the following algorithm, which may be multi-threaded, after creating a block according to the rules of a standard BFT algorithm, such as, for example, HotStuff BFT. The validator node may broadcast the block_info to all of the validator nodes in the distributed network:

```
ranges = [ ]
signature = None
finished = False
(block_hash, prior_block_depth, current_block_depth)
broadcast(block_info)
for level in range(TREE_DEPTH):
    wait until phase ceil(log(n))+1+level
    with lock:
        broadcast (block_info, signature, ranges)
```

The first thread of the multi-threaded algorithm may process received messages using a priority queue that prioritizes messages based on the total stake of the node, or virtual node, the message is from, and may validate the signatures received in those messages:

```
while not finished:
    (block_info2, start_index, end_index, signature2) =
        receive_by_priority( )
    if (block_info = block_info2) and valid_new_ranges([start_index,
end_index], ranges)
        verify(block_info, get_public_key(start_index, end_index),
            signature2):
    new_ranges = append_and_merge(ranges, [start_index, end_index]
    new_signatures = combine_signatures(signature, signature2)
    with lock:
        ranges = new_ranges
        signature = new_signatures
```

The threads of the multi-threaded algorithm may, after being started, be stopped and joined at phase $2*ceil(log(n))+1$. The block_info, ranges, and signatures, may then be broadcast to the validator nodes.

```
t1 = threading.Thread(target=thread1)
t2 = threading.Thread(target=thread2)
t1.start( )
t2.start( )
wait_for_phase(2 * ceil(log2(num_validators)) + 1)
finished = True
terminate_receive_by_priority_queue( )
t1.join( )
t2.join( )
broadcast(block_info, ranges, signatures)
```

Between each block, or after some specified number of blocks, the tree structure may be changed through reshuffling of the validator nodes in the tree structure. The changes may, for example, move more reliable nodes left in the tree structure and less reliable nodes further right in the tree structure. Tree reshuffling may be run on every validator node in the tree structure. The results of the tree reshuffling may be included in the block in the form of a merkle tree.

Tree reshuffling may look at a sliding window of the last W valid blocks and count how many infractions each validator node has committed. An infraction may be either not being part of a consensus for a block, or being one of two validator nodes that should have combined signatures but instead sent their signatures to the validator node that is the block producer directly. The block producer may include a proof of this infraction in the form of the two signed messages in the block body.

Each infraction may be given a different weight, and the infraction count may be summed up for each validator node over the sliding window. The top R validator nodes with non-zero infraction counts may be sorted by infraction count descending and tree position and may be removed from the tree structure and re-inserted at the right side of tree structure in a random order. This may create large subtrees on the left side of the tree structure that include the most reliable validator node. The unreliable validator nodes may be on the right side of the tree structure. The validator node that is the block producer may then choose to given preference to messages received from validator nodes from the left side of the tree structure, which may allow a ⅔rds+1 vote on whether to validate a block to be accumulated quickly from the reliable validator nodes.

The tree reshuffling phase may also include both adding and removing validator nodes from the tree structure. New validator nodes may be added at the rightmost side of the tree structure, while retiring validator nodes may be removed from the tree structure.

Performing validation of blocks using a tree structure for BFT may require the ability to get the combined public key of all validator nodes between a given start_index and end_index quickly. Precomputing the tree of public keys and including this as a merkle tree in the block may reduce the cost of generating the public keys and verifying signatures from $O(n)$ to $O(log(n))$ for an arbitrary range and constant time for the branches in the tree structure. The cost of initially generating this public key tree may be amortized over many blocks. Updating a public key tree after a reshuffle of the tree structure may be done in $O(r*log(n))$ time, where r is the number of validator nodes moved within the tree structure.

The total number of phases required per block may be reduced in a number of ways. For example, the tree structure may, instead of being a binary tree, have its branching factor increased to be larger than 2. The top few levels of the tree structure, which are unlikely to have agreements between left and right nodes, may be removed, allowing their phases to be skipped. The validator node that is the block producer may end the algorithm without waiting for validator nodes from which votes have not been received if ⅔rds+1 yes votes or ⅔rds+1 no votes are already collected.

A tree structure with one million validator nodes may take 42 total phases to complete, of which 22 may require a broadcast. If the tree structure used a 32-way branching factor, the number of phases may be reduced to 10 phases, with six phases requiring a broadcast. Removing the top two levels of the tree structure may further reduce this to six phases, of which four phases may require a broadcast. 32-way branching may have all of the validator nodes send their signatures to the leftmost validator node among the branches with the same parent. The leftmost validator node may internally simulate the combining logic for the signatures in the binary tree.

FIG. 1 shows an example system suitable for a tree structure for byzantine fault tolerance according to an implementation of the disclosed subject matter. A validator computing device 100 may include a database client 110 and a storage 140. The validator computing device 100 may be any suitable computing device, such as, for example, a computer 20 as described in FIG. 8, or component thereof, for implementing the database client 110 and the storage 140. The validator computing device 100 may be a single computing device, or may include multiple connected computing devices, and may be, for example, a laptop, a desktop, an individual server, a server farm, or a distributed server system, or may be a virtual computing device or system. The validator computing device 100 may be part of a computing system and network infrastructure, or may be otherwise connected to the computing system and network infrastructure. The validator computing device 100 may be, for example, a computing device or system that is part of a distributed network and that serves as a validator node for a decentralized database stored as a blockchain database. The database client 110 may be any suitable combination of hardware and software on the validator computing device 100 for interacting with and performing functions related to the decentralized database, which may be, for example, a blockchain database stored across multiple computing devices. The storage 140 may be any suitable combination of hardware and software for storing data, including any suitable volatile and non-volatile storage.

The database client 110 may be any suitable combination of hardware and software on the validator computing device 100 for interacting with and performing functions related to the decentralized database. The decentralized database may be a blockchain database. The database client 110 may allow for the validator computing device 100 to interact with, and be a part of, the decentralized database. For example, the database client 110 may maintain a copy of the decentralized database in the storage 140 of the validator computing device 100. Functions implemented by the database client 110 may include, for example, the production of a candidate block to be validated and added to the blockchain database, validation of a candidate block, sending and receiving messages to and from other validator computing devices that are part of the distributed network, comparing signatures that include votes on validating the candidate block to determine agreement or disagreement, checking for signatures in signature lists, and reshuffling a tree structure 144.

The storage 140 may store a database 142. The database 142 may be, for example, a copy of the blockchain of the decentralized database. The database 142 may be stored as, for example, a series of blocks, and may be append only. The database 142, as stored on the validator computing device 100, may be a complete copy of the blockchain of the decentralized database including all blocks written to the blockchain since its inception, or may be a partial copy. The database 142 may include a tree structure 144, which may be a tree structure that orders validator computing devices, including the validator computing device 100, of the distributed network into a tree structure for byzantine fault tolerance. The tree structure 144 may be stored, for example, in the form of a merkle tree in a block of the database 142. Each block of the database 142 may store a tree structure that may be used to validate the next candidate block to be added to the blockchain of the decentralized database that the database 142 is a copy of.

Figure 2:
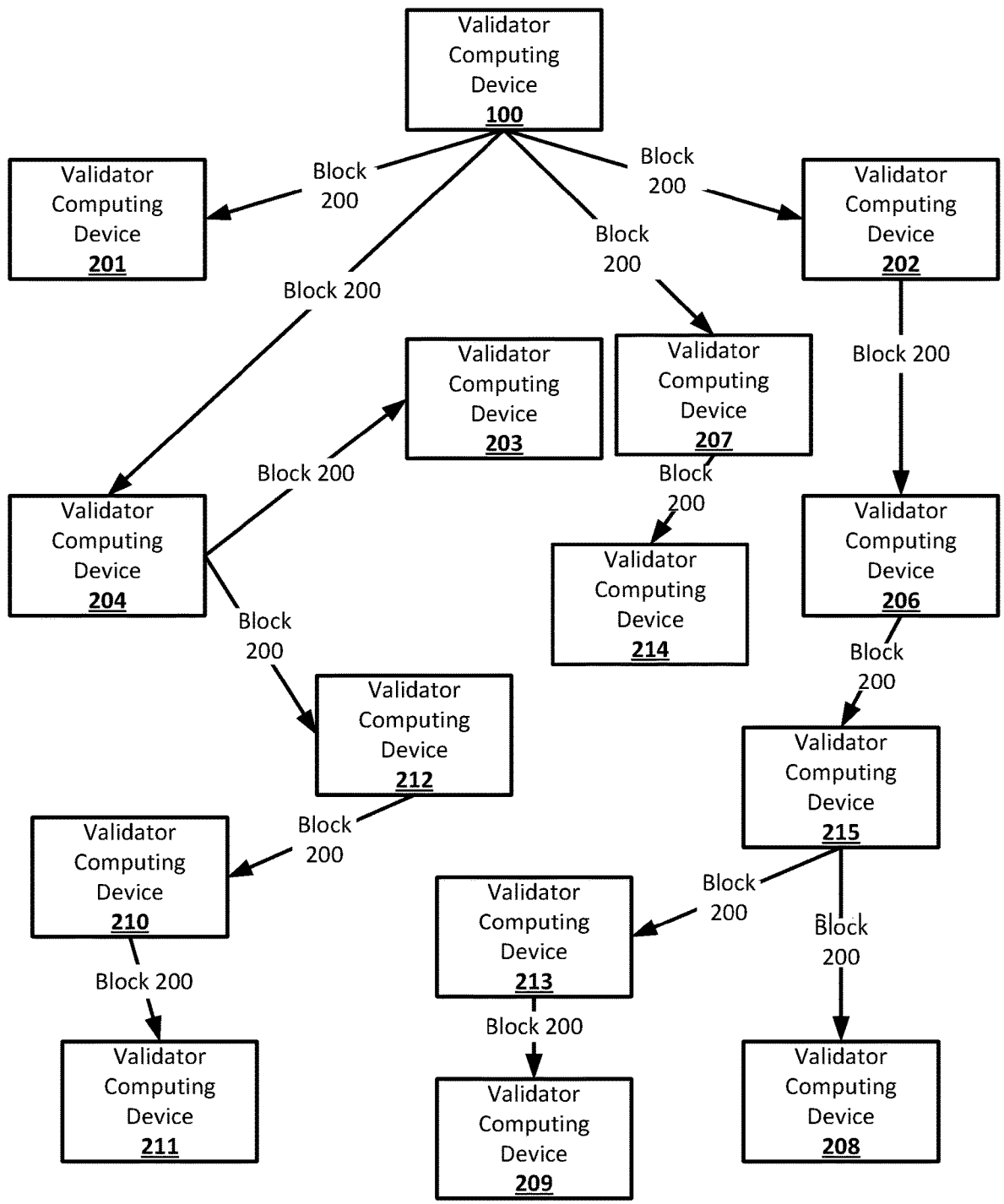
FIG. 2 shows an example arrangement suitable for a tree structure for byzantine fault tolerance according to an implementation of the disclosed subject matter.

FIG. 2 shows an example system suitable for a tree structure for byzantine fault tolerance according to an implementation of the disclosed subject matter. In an initial phase, phase 0, a validator computing device may act as a block producer and generate a candidate block that may then be broadcast to the other validator computing devices in the distributed network. For example, the validator computing device 100 may act as a block producer of the block 200, which may be a candidate block. The validator computing device 100 may then broadcast the block 200 to the validator computing devices 201, 202, 203, 204, 205, 206, 207, 208, 209, 210, 211, 212, 213, 214, and 215 for validation. The block 200 may be broadcast along with the signed tuple block_info=(block_hash, prior_block_depth, current_block_depth). The validator computing device 100 may broadcast the block 200 by sending the block 200 to the validator computing devices 201, 202, 203, 204, 205, 206, 207, 208, 209, 210, 211, 212, 213, 214, and 215 itself, or through peer-to-peer distribution among the validator computing devices validator computing devices 201, 202, 203, 204, 205, 206, 207, 208, 209, 210, 211, 212, 213, 214, and 215. The block 200 may be a block of any suitable data that may be stored in a blockchain database. For example, the block 200 may include transaction data for a cryptocurrency.

Each of the validator computing devices 201, 202, 203, 204, 205, 206, 207, 208, 209, 210, 211, 212, 213, 214, and 215 may determine whether they consider the block 200 to be a valid block or a not valid block, and whether the depths and signatures of the validator computing device 100 received with the signed tuple are valid. Each validator computing device that determines that the block, depths, and signatures are valid may sign block_info, indicating a "yes" vote for validating block. Each validator computing device that determines that any of the blocks, depths, and signatures are invalid may sign (null, current_block_depth) to indicate a "no" vote for validating the block. The validator computing device signatures may be, for example, cryptographic signatures made using private keys of the validator computing devices and verified using public keys of the validator computing devices.

Each of the validator computing devices 201, 202, 203, 204, 205, 206, 207, 208, 209, 210, 211, 212, 213, 214, and 215 may have its own database client, such as the database client 110, which may perform operations related to the block 200 and sending and receiving messages to and from other validator computing devices.

FIG. 3A shows an example system suitable for a tree structure for byzantine fault tolerance according to an implementation of the disclosed subject matter. In phases 1 through ceil(log(n)), each level of the tree, starting from the bottom of the tree, may have child nodes of the same parent node in the tree structure 144 communicate their decisions on validating the block 200 to each other to determine whether they agree. Nodes at the first, bottom, level of the tree structure 144 may be the validator computing devices 100, 201, 202, 203, 204, 205, 206, 207, 208, 209, 210, 211, 212, 213, 214, and 215. Nodes at the higher levels of the tree structure 144 may be virtual nodes, such as the virtual nodes 301, 302, 303, 304, 305, 306, 307, 308, 309, 310, 311, 312, 313, 314, 315, and 316. The tree structure 144 may be, for example, a binary tree.

The validator computing devices 100 and 201, 202 and 203, 204 and 205, 206 and 207, 208 and 209, 210 and 211, 212 and 213, and 214 and 215 may each exchange messages to determine whether they agree on validating the block 200. For example, the validator computing device 204 may send a message to the validator computing device 205 that includes block_info signed by the validator computing device 204. The validator computing device 205 may send a message to the validator computing device 204 that includes block_info signed by the validator computing device 205. Both the validator computing device 204 and the validator computing device 205 may determine that they agree on validating the block 200.

The validator computing device 208 may send a message to the validator computing device 209 that includes (null, current_block_depth) signed by the validator computing device 208. The validator computing device 209 may send a message to the validator computing device 208 that includes block_info signed by the validator computing device 209. Both the validator computing device 208 and the validator computing device 209 may determine that they disagree on validating the block 200.

Signatures from nodes that agree may be shared and combined, for example, by both nodes, or by just the leftmost node. For example, the signatures of the validator computing devices 202 and 203 may be combined by the validator computing device 202. When nodes disagree, they may separately send their signed messages to the validator node that is the block producer. For example, the validator computing devices 208 and 209 may disagree, and may each send their signed messages to the validator computing device 100.

Figure 3B:
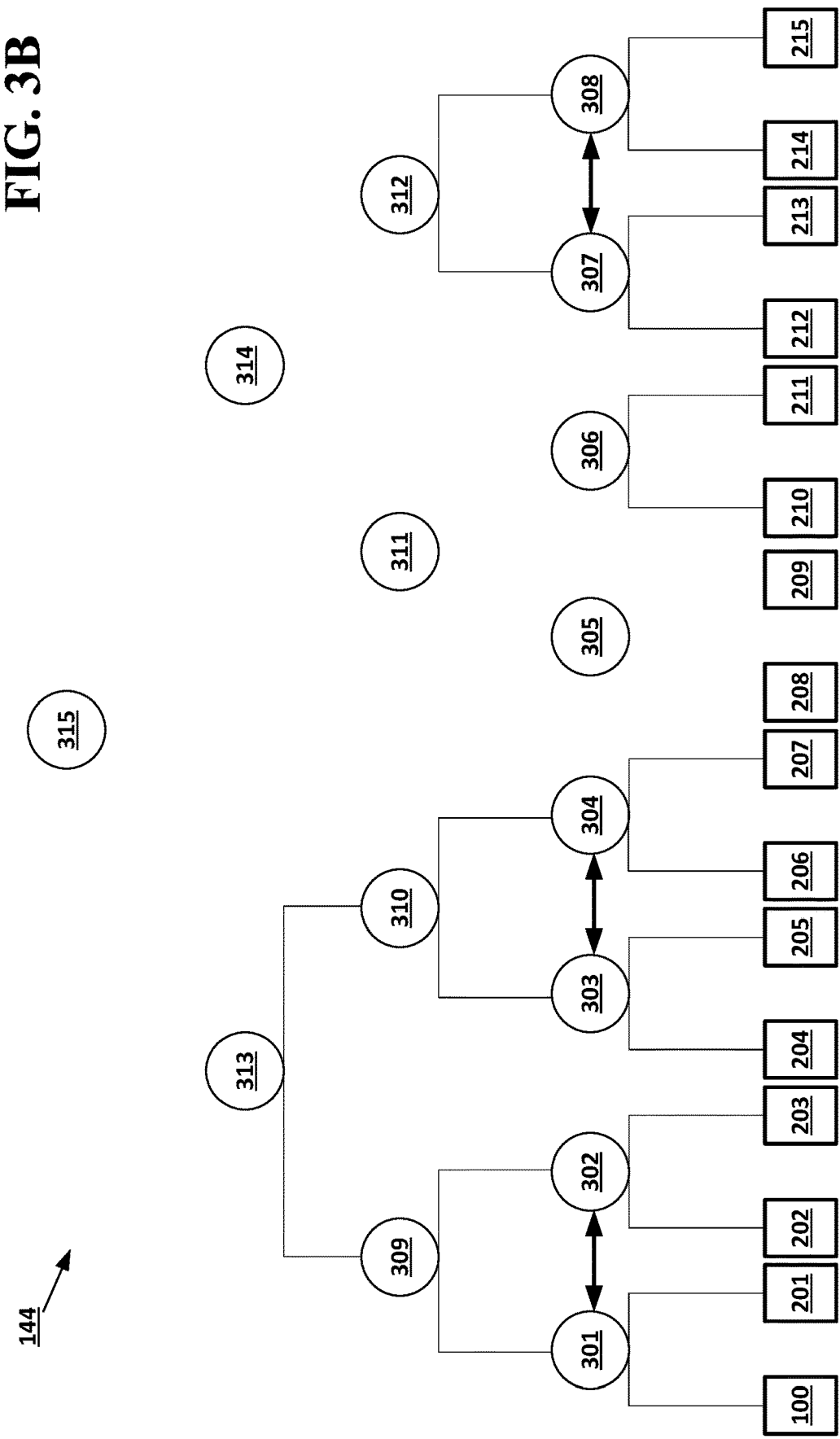
FIG. 3B shows an example arrangement suitable for a tree structure for byzantine fault tolerance according to an implementation of the disclosed subject matter.

FIG. 3B shows an example system suitable for a tree structure for byzantine fault tolerance according to an implementation of the disclosed subject matter. After messages are exchanged between nodes on the first level of the tree structure 144, virtual nodes with disagreeing child nodes may be removed from the tree structure 144. For example, the virtual node 305 may be removed due to the disagreement between the validator computing devices 208 and 209. Any virtual node higher in the tree structure 144 that is left with only one child node after the removal of a virtual node may also be removed. For example, removal of the virtual node 305 may result in the removal of the virtual nodes 311, 314, and 315 from the tree structure 144. This may break the tree structure 144 into some number of separate subtrees of varying depths. Operations on the tree structure 144, such as removing virtual nodes, may be performed by, for example, the database client 110.

Once virtual nodes have been removed, messages may be exchanged between the remaining virtual nodes on the second level of the tree structure 144 that are the child nodes of the same parent node. The virtual nodes may be operated by the validator computing device that is their leftmost child node on the first level of the tree structure 144, which may be one of the validator computing devices. For example, the virtual node 303 may be operated by the validator computing device 204. A validator computing device may operate a virtual node by performing all of the processing for the virtual node, for example, as if the validator computing device is located in the position of the virtual node in the tree structure 144.

The virtual nodes 301 and 302, 303 and 304, and 307 and 308 may send messages to each other on the second level of the tree structure 144. The messages may be sent by the validator nodes that operate the virtual nodes. For example, the message from the virtual node 301 to the virtual node 302 may be sent by the validator computing device 100 to the validator computing device 202, and vice versa for the message from the virtual node 302 to the virtual node 301. The messages between virtual nodes may include the signatures that were combined after messaging at the previous level of the tree structure 144. For example, the message from the virtual node 303 to the virtual node 304 may include the combined signatures of the validator computing devices 204 and 205, which may have agreed that the block 200 is valid. As at the previous level of the tree structure 144, messages between sibling nodes which agree on whether or not the block 200 is valid may have their signatures combined by the leftmost validator computing device in the subtree, while messages that disagree may be sent directly to the validator computing device 100. For example, if the message from the virtual node 304, as sent by the validator computing device 206, indicates that both the validator computing devices 206 and 207 agree that the block 200 is valid, the validator computing device 204 may combine the combined signatures of the validator computing devices 204 and 205, which agree that the block 200 is valid, with the combined signatures of the validator computing devices 206 and 207.

Messages with signatures may also be sent directly to the validator computing device 100 from any virtual node at the second level that is the root node of its subtree. For example, the virtual node 306 may be the root node of its subtree, so the validator computing device 210, which may operate the virtual node 306, may send the combined signatures of the validator computing devices 210 and 211 to the validator computing device 100. The validator computing devices 210 and 211 may have agreed on whether or not the block 200 was valid, for example, either both determining that the block 200 is valid or both determining that the block 200 is invalid.

Figure 3C:
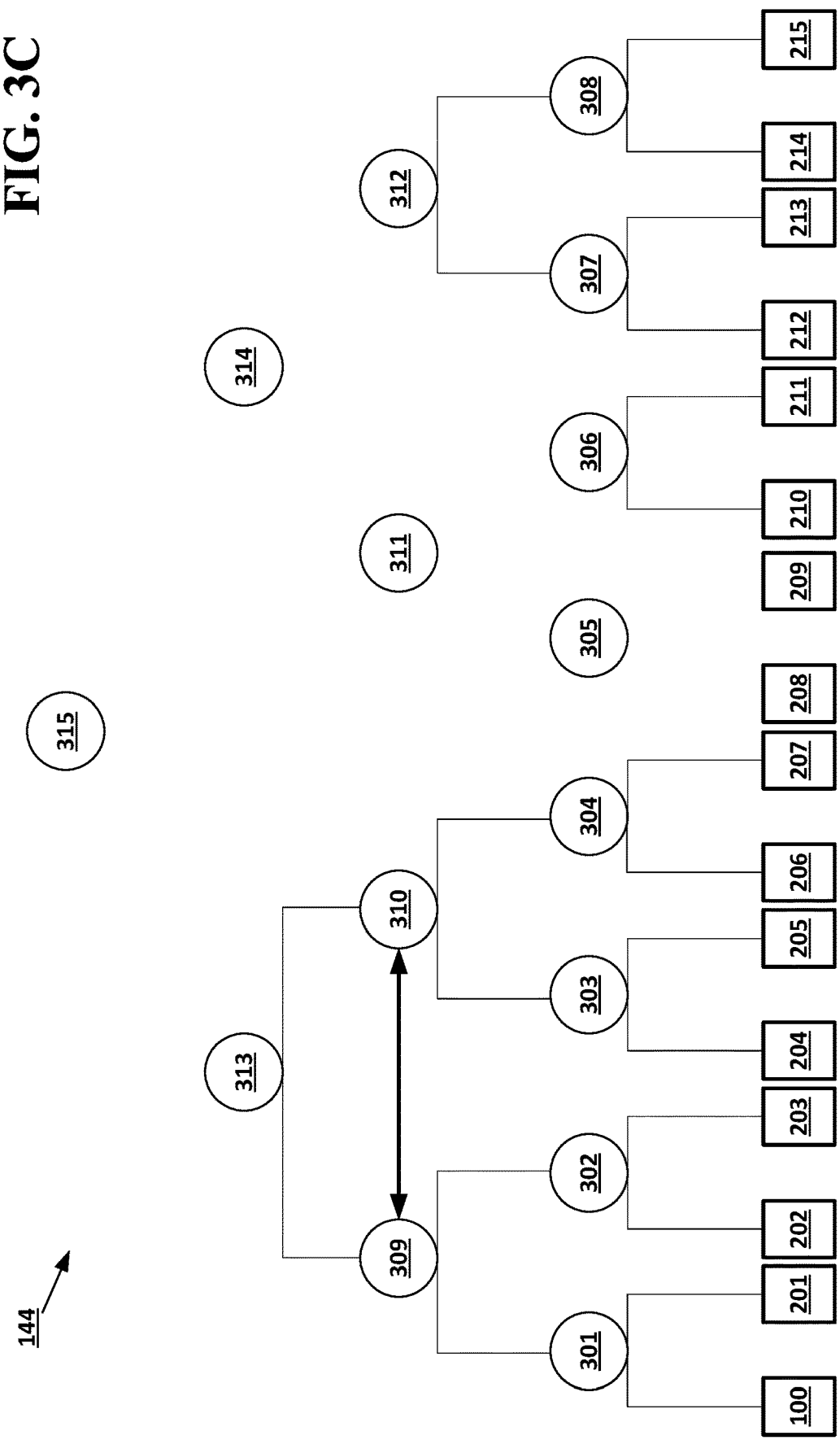
FIG. 3C shows an example arrangement suitable for a tree structure for byzantine fault tolerance according to an implementation of the disclosed subject matter.

FIG. 3C shows an example system suitable for a tree structure for byzantine fault tolerance according to an implementation of the disclosed subject matter. After messages are exchanged between nodes on the second level of the tree structure 144, virtual nodes with disagreeing child nodes may again be removed from the tree structure 144. Once virtual nodes have been removed, messages may again be exchanged between the remaining virtual nodes on the second level of the tree structure 144 that are the child nodes of the same parent node. The virtual nodes may be operated by their leftmost child node on the first level of the tree structure 144, which may be one of the validator computing devices. For example, the virtual node 309 may be operated by the validator computing device 100, and the virtual node 310 may be operated by the validator computing device 204. The signatures in the exchanged messages may again be combined if they agree on whether the block 200 is valid, and sent directly to the validator computing device 100 if they disagree.

Messages with signatures may also be sent directly to the validator computing device 100 from any virtual node at the third level that is the root node of its subtree. For example, the virtual node 312 may be the root node of its subtree, so the validator computing device 212, which may operate the virtual node 312, may send the combined signatures of the validator computing devices 212, 213, 214, and 215 to the validator computing device 100. The validator computing devices 212, 213, 214, and 215 may have agreed on whether or not the block 200 was valid, for example, either all determining that the block 200 is valid or all determining that the block 200 is invalid.

Once the top of the remaining tree structure 144 is reached, for example, after ceil(log(n)) phases, one for each level of the tree structure 144, phases ceil(log(n))+1 to 2*ceil(log(n)) may begin with the broadcasting of all signatures received by the validator computing device 100 to the other validator nodes in the tree structure 144. The broadcasting may occur in a top-down manner, with the right node at each level checking to ensure that the left node at that level sent the signature of the right node to the validator computing device 100. For example, the virtual node 310, operating by the validator computing device 204, may check the broadcast signatures to ensure that the virtual node 309, operating by the validator computing device 100, sent any signatures combined by the validator computing device 204 to the validator computing device 100. The virtual node 304 may check the broadcast signatures to ensure that any signatures combined by the validator computing device 206 were sent by the validator computing device 204 to the validator computing device 100. The validator computing device 207 may check the broadcast signatures to ensure that the validator computing device 206 combined the signature of the validator computing device 207 with the signature of the validator computing device 206 and sent the combined signatures to the validator computing device 204. If a validator computing device does not find its signature in the broadcast signatures, the validator computing device may forward a message with (block_info, signature, first_index, last_index) to the validator computing device 100.

Figure 3D:
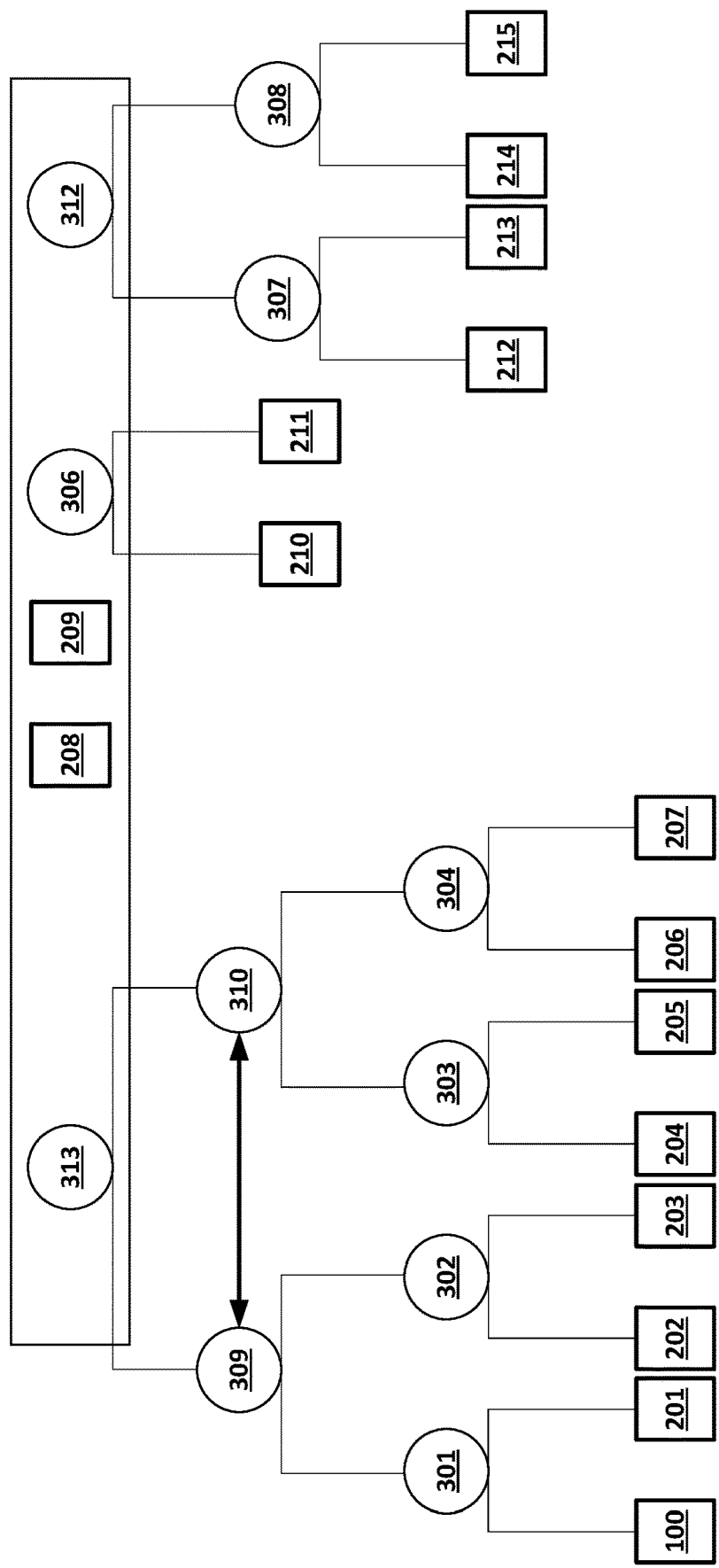
FIG. 3D shows an example arrangement suitable for a tree structure for byzantine fault tolerance according to an implementation of the disclosed subject matter.

FIG. 3D shows an example system suitable for a tree structure for byzantine fault tolerance according to an implementation of the disclosed subject matter. In phase 2*ceil (log(n))+1, the results of the validation of the block 200 may be determined and broadcast t to the validator nodes. The results may be determined according to, for example, weighted HotStuff BFT consensus performed among the root nodes of the remaining subtree of the tree structure 144. For example, the remaining root nodes may be the virtual node 313, the validator computing devices 208 and 209, the virtual node 306, and the virtual node 312. The root nodes may be weighted by, for example, how many validator computing devices are at the bottom level of their subtree. The root node may vote for all of the validator computing devices in its subtree, as all of the validator computing devices in the same subtree may agree on the whether or not the block 200 is valid. For example, the root node 313, operated by the validator computing device 100, may vote on behalf of the validator computing device 100, 201, 202, 203, 204, 205, 206, and 207. Messages for voting may be sent and received among the validator computing devices that operate the virtual nodes that are the root nodes of the subtrees and the validator computing devices that are the root nodes of their own subtrees by virtue of being the only node in their subtree. This may reduce the overall amount of communication needed to reach consensus, as not all of the validator computing devices will need to send and receive and messages in order to be represented in the voting, with the validator computing device that operates the virtual node that is their root node will act on their behalf.

Once consensus has been reached among the root nodes of the tree structure 144, for example, validating the block 200 or determining that the block 200 is invalid based, the validator computing device 100 may broadcast the results to the other validator nodes, as well as to all other nodes in the nodes in the distributed network. The broadcast may include, for example, the block 200 and the signatures so that the block may be added to the blockchain database, for example, being stored with the blocks 148 in the database 142 on the validator computing device 100 and being stored similarly on the computing devices for all other nodes in the distributed network. If the block was determined to be invalid, the block may not be added to the blockchain database stored on the computing devices of the nodes in the distributed network.

Figure 4:
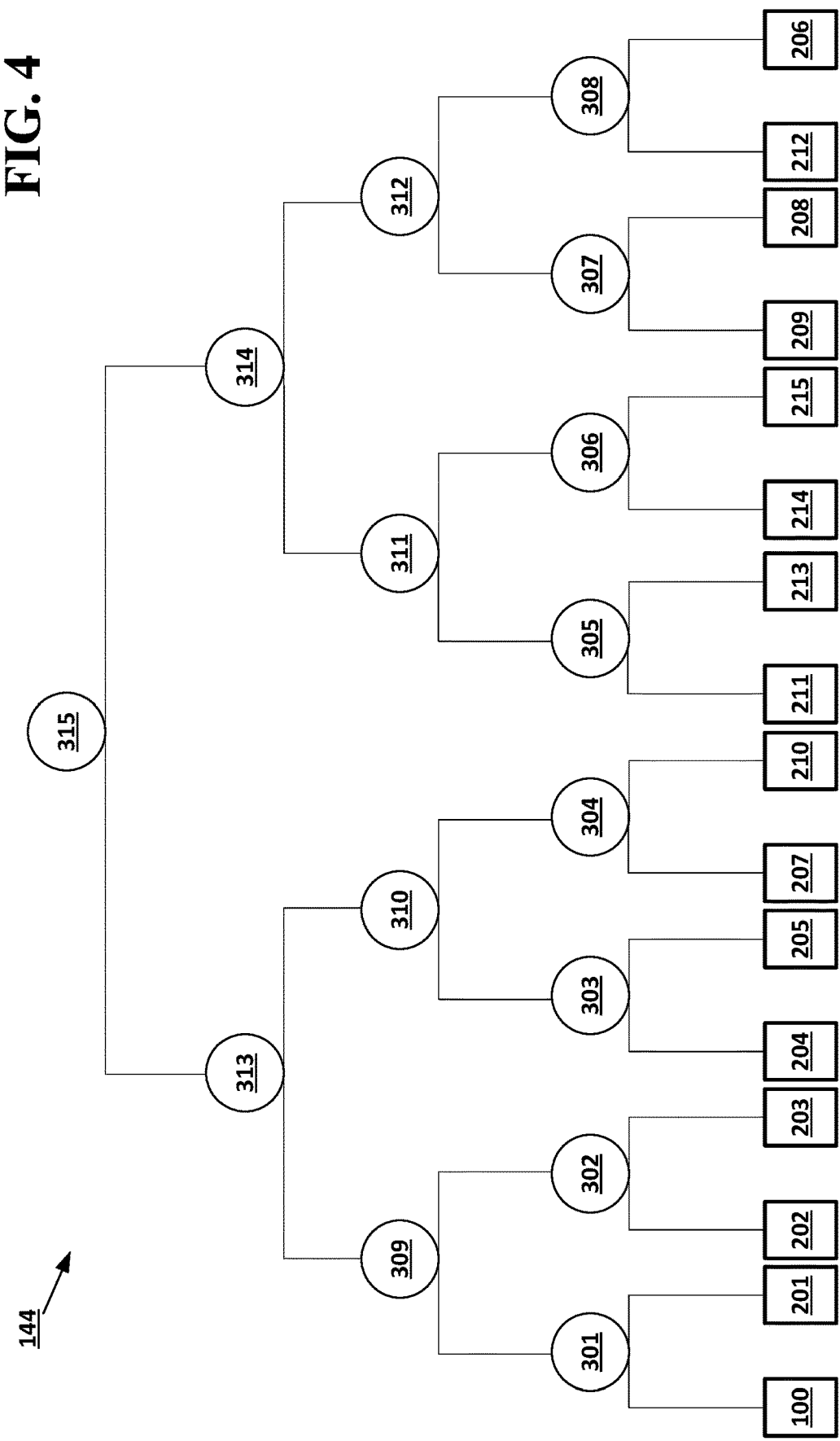
FIG. 4 shows an example arrangement suitable for a tree structure for byzantine fault tolerance according to an implementation of the disclosed subject matter.

FIG. 4 shows an example system suitable for a tree structure for byzantine fault tolerance according to an implementation of the disclosed subject matter. After consensus on a block has been reached, the tree structure 144 may be reshuffled before the next block can be validated. For example, after the block 200 is validated by the validator computing devices of the tree structure 144, the tree structure 144 may be reshuffled.

The number of infractions incurred by the validator computing devices 100, 201, 202, 203, 204, 205, 206, 207, 208, 209, 210, 211, 212, 213, 214, and 215, over a sliding widow of the last W valid blocks may be determined. An infraction may be incurred for not being part of a consensus. For example, the block 200 may have been determined by consensus to be valid. The validator computing device 208 may have determined that the block 200 was invalid, and therefore may not have been part of the consensus for the block 200. This may be an infraction incurred by the validator computing device 208. Infractions may also be incurred when nodes did not combine signatures when they agreed, and instead sent their signatures directly to the block producer for the block, for example, the validator computing device 100 for the block 200. For example, if the validator computing device 214 and the validator computing device 215 both agreed that the block 200 was valid, but instead of combining signatures, sent their signatures individually directly to the validator computing device 100, both the validator computing devices 214 and 215 may incur an infraction. Infractions may be weighted in any suitable manner, and the weighted infractions may be summed for each validator computing device over the sliding window.

The list of validator computing devices may be sorted by infraction count in descending order, with ties broken by tree position, for example, with validator computing devices that are farther left in the tree structure 144 being placed above those that are farther right and have the same infraction count. The top R validator computing devices on the list with non-zero infraction counts, where R is any suitable number, may be removed from their location in the tree structure 144 and reinserted randomly on the right side of the tree structure 144. This may create subtrees on the left side of the tree structure 144 that include more reliable validator computing devices, and subtrees on the right side of the tree structure 144 that include less reliable validator computing devices.

For example, R may be 4. The validator computing devices 208, 209, 206, and 212 may be the 4 validator computing devices that have the most infractions over the previous K blocks. They may be moved to the right of the tree structure 144 and inserted randomly, with other validator computing devices being moved left. The tree structure 144 may be stored as a merkle tree in the block 200, which may become part of the blockchain of the decentralized database. Validator computing devices may also be removed and replaced with newer validator computing devices, and a different validator computing device may be chosen as the block producer for the block that follows the block 200.

Figure 5:
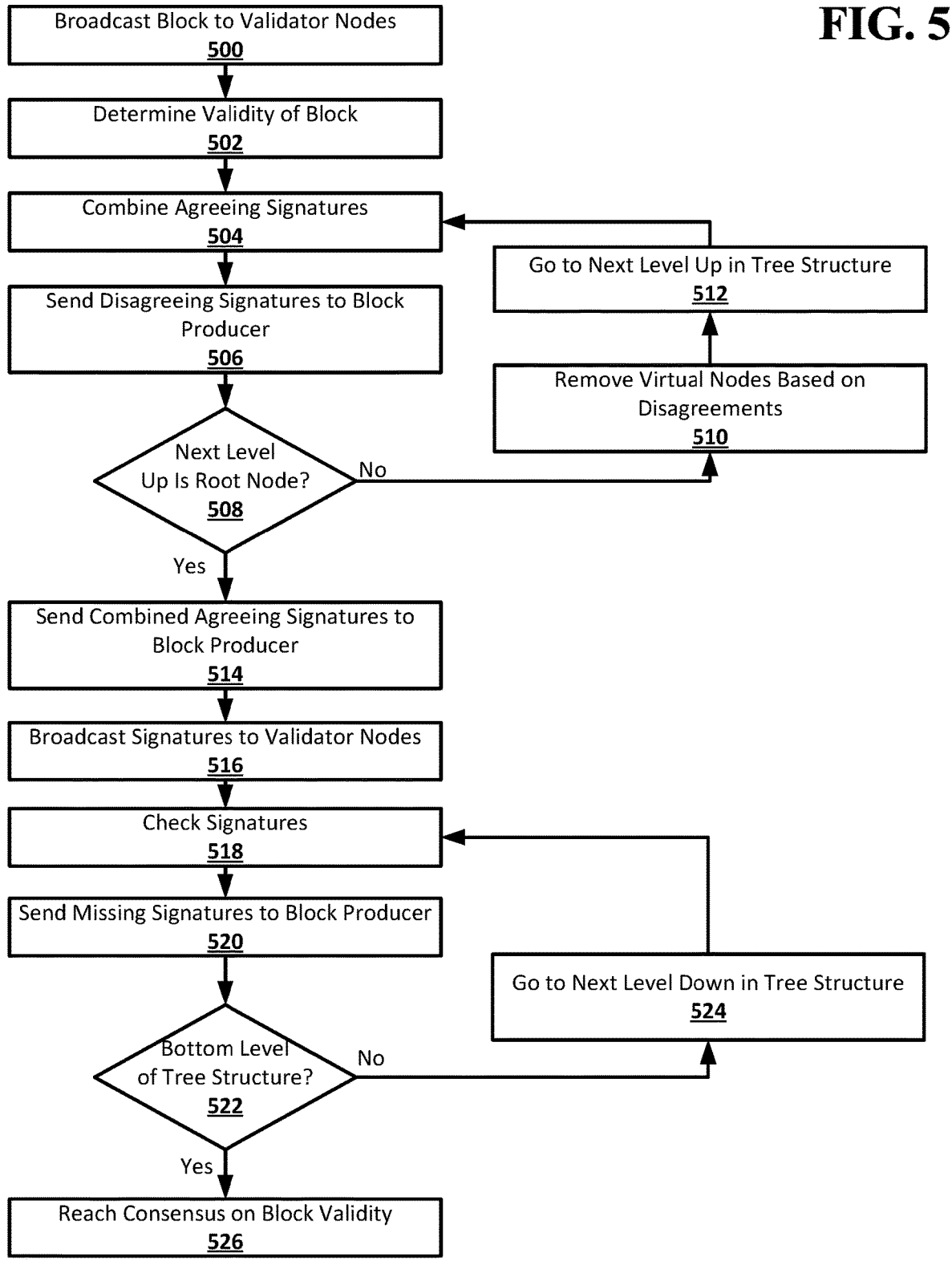
FIG. 5 shows an example procedure suitable for a tree structure for byzantine fault tolerance according to an implementation of the disclosed subject matter.

FIG. 5 shows an example procedure suitable for a tree structure for byzantine fault tolerance according to an implementation of the disclosed subject matter. At 500, a block may be broadcast to validator nodes. For example, the validator computing device 100 may be a block producer for the block 200, which may be a candidate block to be added to a blockchain of a decentralized database, for example, as stored in the blocks 148 of the database 142. The validator computing device 100 may broadcast the block 200 to all of the validator nodes for the decentralized network, for example, the validator computing devices 100, 201, 202, 203, 204, 205, 206, 207, 208, 209, 210, 211, 212, 213, 214, and 215. The validator computing devices may be listed, for example, in the tree structure 144.

At 502, the validity of the block may be determined. For example, each of the validator computing devices 100, 201, 202, 203, 204, 205, 206, 207, 208, 209, 210, 211, 212, 213, 214, and 215 may separately determine whether the block 200 is valid or invalid in any suitable manner, such as, for example, according to HotStuff BFT rules.

At 504, agreeing signatures may be combined. Validator nodes, either as validator computing devices or virtual nodes, that are sibling nodes in the tree structure 144 may exchange messages, including signatures, indicating whether they have determined that the block 200 is valid or invalid. When sibling nodes agree on the validity of the block, their signatures may be combined.

At 506, disagreeing signatures may be sent to the block producer. For example, when sibling validator nodes disagree on whether the block 200 is valid, the validator nodes may send their signatures directly to the block producer, for example, the validator computing device 100.

At 508, if the next level up from the validator nodes that combined agreeing signatures in 504 or sent disagreeing signatures to the block producer in 506 includes the root node of the tree structure, flow may proceed to 514. Otherwise, flow may proceed to 510. For example, the virtual node 315 may be the root node of the tree structure 144. If the virtual nodes 313 and 314 have just combined agreeing signatures or sent disagreeing signatures to the block produce, the validator computing device 100, flow may proceed to 514. Otherwise, flow may proceed to 510, where validator nodes may be removed before 504 is repeated with the validator nodes at the next level up in the tree structure.

At 510, validator nodes may be removed based on disagreements. When sibling nodes disagree on the validity of the block 200, their parent node, which may be a virtual node, may be removed, along with any nodes left without a sibling node or two child nodes by the removal of the parent node. For example, disagreement between the virtual node 307 and the virtual node 308, reflecting a disagreement between the validator computing devices 212 and 213 and the validator computing devices 214 and 215, would result in the removal of the virtual node 312, its sibling virtual node 311, their parent virtual node 314, and its parent virtual node 315, from the tree structure 144.

At 512, processing may proceed to the next level up in the tree structure. For example, if the bottom level of the tree structure 144 was processed at 504 and 506 before 512 was reached, the second level of the tree structure 144 may be processed when 504 and 506 are reached after 512 is reached.

At 514, combined agreeing signatures may be sent to the block producer. For example, any combined signatures held by any of the validator computing devices 100, 201, 202, 203, 204, 205, 206, 207, 208, 209, 210, 211, 212, 213, 214, and 215, may be sent to the block producer, which may be the validator computing device 100. The number of sets of combined signatures may depend on the number of disagreements over the validity of the block 200 and where the disagreements occurred within the tree structure 144.

At 516, signatures may be broadcast to validator nodes. For example, the block producer, which may be the validator computing device 100, may broadcast all of the signatures received from the validator computing device 100, 201, 202, 203, 204, 205, 206, 207, 208, 209, 210, 211, 212, 213, 214, and 215 to the validator computing device 100, 201, 202, 203, 204, 205, 206, 207, 208, 209, 210, 211, 212, 213, 214, and 215.

At 518, combined signatures may be checked. Validator nodes that expected to have their signature combined with the signature of another validator node and sent to the block producer may determine whether this occurred, or whether their signature is missing from the signatures broadcast by the block producer.

At 520, missing signatures may be sent to the block producer. For example, a validator node that has determined that its signature is missing from the signatures broadcast by the block producer, for example, the validator computing device 100, may send its signature directly to the block producer.

At 522, if the bottom level of the tree structure 522 has been reached, flow may proceed to 526. Otherwise, flow may proceed to 524. For example, the signatures in 518 may initially be checked at the top level of the tree structure 144 below the root node, for example, by the validator computing devices the operate the virtual nodes at the top level of the tree structure 144.

At 524, processing may proceed to the next level down in the tree structure. For example, if the top level below the root of the tree structure 144 was processed at 518 and 520 before 524 was reached, the next level down of the tree structure 144 may be processed when 518 and 520 are reached after 524 is reached.

At 526, consensus on block validity may be reached. For example, the validator nodes at the top levels of the subtrees of the tree structure 144 after the removal of validator nodes due to disagreements may participate in any suitable consensus algorithm to determine whether the block 200 is valid or invalid based on the determinations made by the validator computing devices 100, 201, 202, 203, 204, 205, 206, 207, 208, 209, 210, 211, 212, 213, 214, and 215, as reflected by their signatures. The consensus may be, for example, weighted HotStuff BFT consensus. Once consensus is reached, if the block 200 is determined to be valid, the block 200 may distributed to the nodes of the distributed network so that it may be added to the blockchain of the decentralized database.

Figure 6:
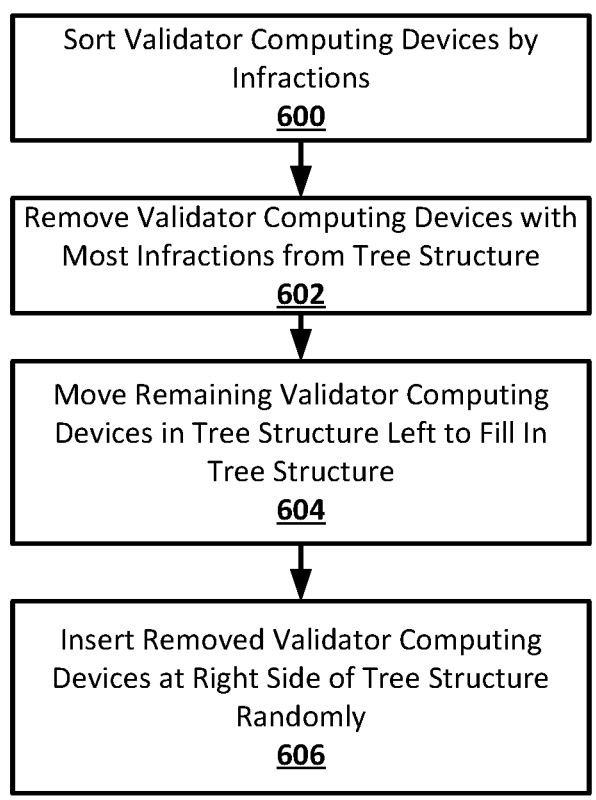
FIG. 6 shows an example procedure suitable for a tree structure for byzantine fault tolerance according to an implementation of the disclosed subject matter.

FIG. 6 shows an example procedure suitable for a tree structure for byzantine fault tolerance according to an implementation of the disclosed subject matter. At 600, validator computing devices may be sorted by infractions. For example, the validator computing devices 100, 201, 202, 203, 204, 205, 206, 207, 208, 209, 210, 211, 212, 213, 214, and 215 may be sorted by weighted infractions over some previous number of blocks. The infractions may include, for example, not being part of the consensus for a block, or sending a signature directly to a block producer when the signature should have been combined with a signature from a sibling validator node.

At 602, validator computing devices with the most infractions may be removed from the tree structure. For example, some number of the validator computing devices 100, 201, 202, 203, 204, 205, 206, 207, 208, 209, 210, 211, 212, 213, 214, and 215 with the highest value for weighted infractions may be removed from the tree structure 144.

At 604, remaining validator nodes may be moved left in the tree structure to fill in the tree structure. For example, any of the validator computing devices 100, 201, 202, 203, 204, 205, 206, 207, 208, 209, 210, 211, 212, 213, 214, and 215 that were not removed from the tree structure 144 may be moved to the left in the tree structure 144 in order to take the place of the validator computing devices that were removed from the tree structure 144. The validator computing devices that are moved left may fill in the empty spots in the tree structure 144 vacated by the removed validator computing devices. Only those validator computing devices that have empty spots to their left may be moved.

At 606, removed validator computing devices may be inserted at the right side of the tree structure randomly. For example, the validator computing devices removed from the tree structure 144 at 602 may be reinserted at the right side of the tree structure 144 in random order. The right side of the tree structure 144 may have a number of empty spots equal to the number of removed validator computing devices due to the moving of the remaining validator computing devices to the left at 604. This may result in reshuffled tree structure 144, where more reliable validator computing devices are located to the left, and less reliable validator computing devices are located to the right. The reshuffled tree structure 144 may be stored in the just-validated block, for example, the block 200, as a merkle tree.

Figure 7:
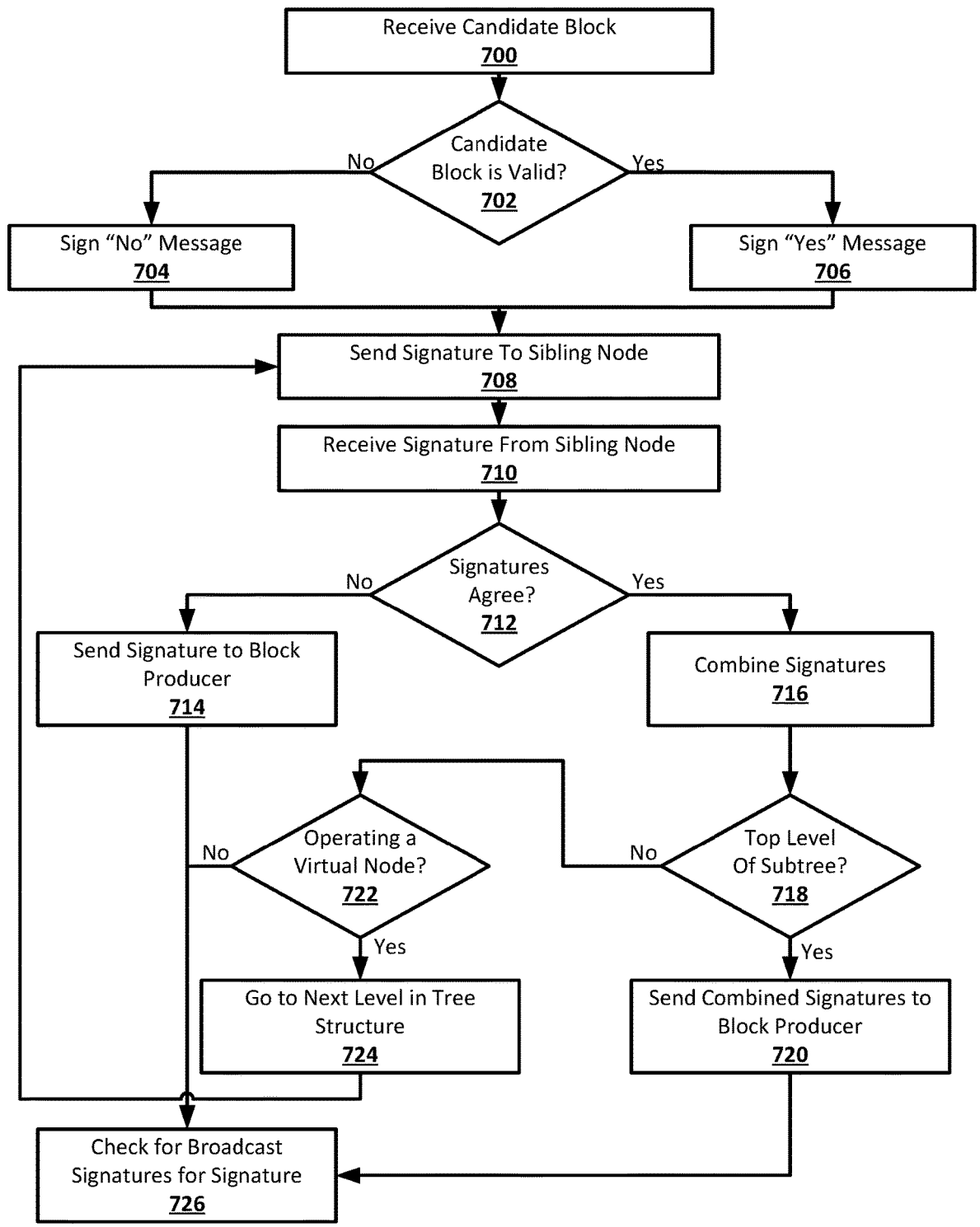
FIG. 7 shows an example a procedure suitable for a tree structure for byzantine fault tolerance according to an implementation of the disclosed subject matter.

FIG. 7 shows an example procedure suitable for a tree structure for byzantine fault tolerance according to an implementation of the disclosed subject matter. At 700, a candidate block may be received. For example, a validator computing device, such as the validator computing device 201, may receive a candidate block, such as the block 200, from a block producer, for example, the validator computing device 100.

At 702, it may be determined whether the candidate block is valid. If the candidate block is determined to be valid, flow may proceed to 706. Otherwise, flow may proceed to 704. For example, the validator computing device 202 may determine the validity of the block 200 according to HotStuff BFT rules.

At 704, a "no" message may be signed. For example, the validator computing device 201 may have determined that the block 200 is not valid, and may sign a message that indicates that the validator computing device 202 would vote "no" on validating the block 200, creating a "no" signature.

At 706, a "yes" message may be signed. For example, the validator computing device 201 may have determined that the block 200 is valid, and may sign a message that indicates that the validator computing device 202 would vote "yes" on validating the block 200, creating a "yes" signature.

At 708, the signature may be sent to a sibling node. For example, the validator computing device 202 may send the "yes" or "no" signature to its sibling node in the tree structure 144, which may be the validator computing device 203.

At 710, a signature may be received from the sibling node. For example, the validator computing device 202 may receive a "yes" or "no" signature from its sibling node in the tree structure 144, which may be the validator computing device 203. The received signature may indicate whether the sibling node determined that the block 200 was valid or not valid.

At 712, if the signatures agree, flow may proceed to 716. Otherwise, flow may proceed to 714. For example, the validator computing device 202 may compare its own signature with the signature received from its sibling node, the validator computing device 203, to determine if they agree on the validity of the block 200.

At 714, the signature may be sent to the block producer. For example, the validator computing device 202 may have determined that it does not agree with the validator computing device 203 on the validity of the block 200. The validator computing device 202 may send its signature, indicating its determination on the validity of the block 200, directly to the block producer, for example, the validator computing device 100.

At 716, signatures may be combined. For example, the validator computing device 202 may have determined that it agrees with the validator computing device 203 on the validity of the block 200. The validator computing device 202 may combine its signature with the signature from the validator computing device 203.

At 718, if the top level of the subtree has been reached, flow may proceed to 720, otherwise flow may proceed to 722. For example, if the validator computing device 202 is operating the virtual node 302, and the virtual node 309 has been removed, the top of the subtree of the validator computing device 202 may have been reached.

At 720, if the top level of the subtree has been reached, the combined signatures may be sent to block producer. For example, the validator computing device 202 may send the combined signatures, including its own signature, the signature from the validator computing device 203, and other signatures that may have been received and combined while the validator computing device 202 was operating virtual nodes of the tree structure 144, to the block producer, the validator computing device 100.

At 722, if a virtual node is being operated, flow may proceed to 724, otherwise flow may proceed to 726. For example, the validator computing device 202 may be the left most child node of the virtual node 302, and may operate the virtual node 302 if the virtual node 302 is not removed due to disagreement between the validator computing device 202 and the validator computing device 203.

At 724, the next level in the tree structure may be reached. For example, if, at 708 and 710, the validator computing device 202 exchanged signatures with the validator computing device 203, when 724 is reached, the next level of the tree structure 144 may be the level with the virtual node 302. Flow may then proceed back to 708, where the validator computing device 202, operating the virtual node 302, may exchange combined signatures with the validator computing device 100, operating the virtual node 301.

At 726, broadcast signatures may be checked for the signature. For example, the validator computing device 203 may check a list of signatures broadcast by the validator computing device 100 to ensure that is signature is included.

Figure 8:
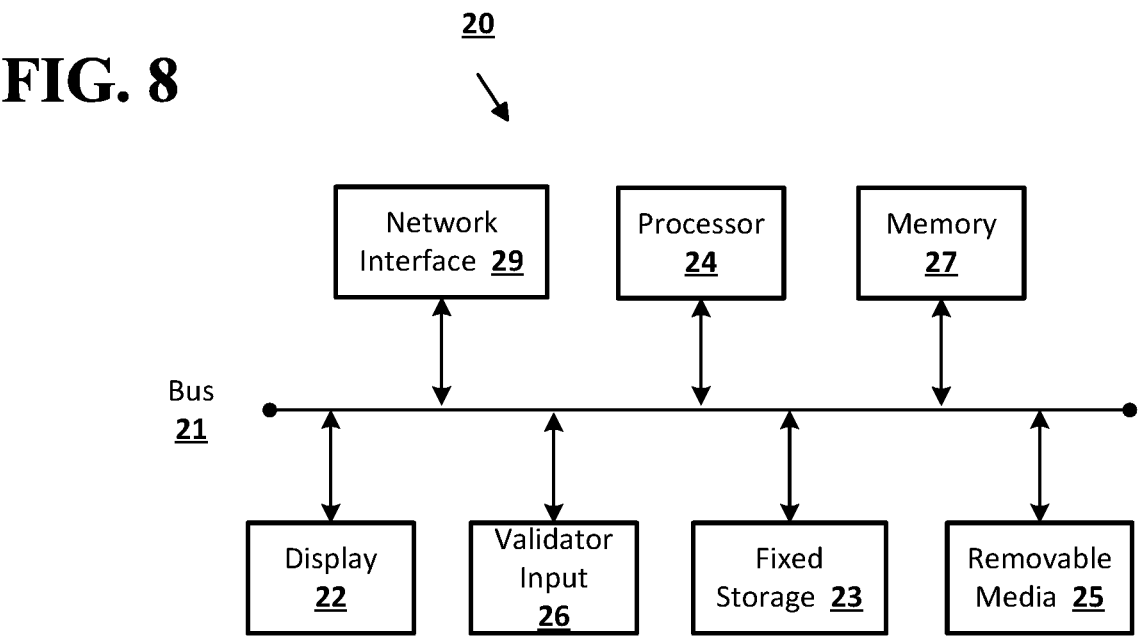
FIG. 8 shows a computer according to an embodiment of the disclosed subject matter.

FIG. 8 shows an example procedure suitable for a tree structure for byzantine fault tolerance according to an implementation of the disclosed subject matter Implementations of the presently disclosed subject matter may be implemented in and used with a variety of component and network architectures. FIG. 8 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 9.

Many other devices or components (not shown) may be connected in a similar manner (e.g., document scanners, digital cameras, and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
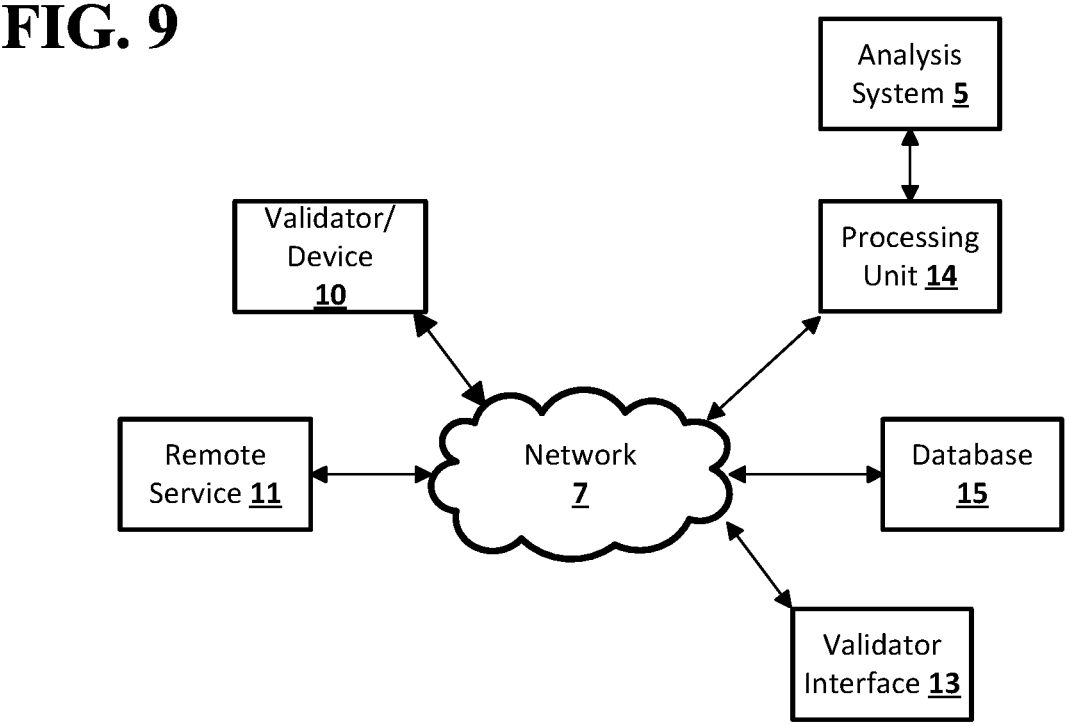
FIG. 9 shows a network configuration according to an embodiment of the disclosed subject matter.

FIG. 9 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
broadcasting, by a first of a plurality of validator computing devices of a distributed network to the rest of the plurality of validator computing devices, a candidate block;
determining, by the validator computing devices, whether the candidate block is valid or invalid;
generating, by each of the validator computing devices, a signature that indicates whether the validator computing device determined the block to be valid or invalid;
combining, by each one of the validator computing devices, the signature of the validator computing device with the signature of a validator computing device that is a sibling node of the one of the validator computing devices in a tree structure when the signature of the one of the validator computing devices and the signature of the validator computing device that is the sibling node agree, to generate combined signatures;
sending, by any validator computing device whose signature disagrees with the signature of a validator computing device that is its sibling node, the signature of the validator computing device to the first validator computing device;
removing, from the tree structure, at least one virtual node based on a disagreement between signatures between sibling validator computing devices, generating one or more independent subtree in the tree structure;
sending, by each of the validator computing devices that is the leftmost child node of a root node of each of the one or more independent subtrees, the combined signatures of the validator computing device to the first validator computing device; and
determining a consensus on whether the candidate block is valid or not valid based on the signatures and combined signatures sent to the first validator computing device.

2. The method of claim 1, further comprising, after removing, from the tree structure, at least one virtual node based on a disagreement between signatures between sibling validator computing devices, generating one or more independent subtree in the tree structure:

combining, by each one of the validator computing devices that operates a virtual node, the combined signatures generated by the validator computing device with the combined signatures generated by a validator computing device that is a operating a virtual node that is a sibling node of the virtual node operated by the one of the validator computing devices in the tree structure when the combined signatures generated by the one of the validator computing devices and the combined signatures generated by the validator computing device that is operating the virtual node that is the sibling node agree, to generate combined signatures; and sending, by any validator computing device operating a virtual node that generated combined signatures that disagree with the combined signatures of a validator computing device that is operating a virtual node that is a sibling node of the virtual node, the combined signatures generated by the validator computing device to the first validator computing device.

3. The method of claim 1, further comprising, before determining a consensus on whether the candidate block is valid or not valid based on the signatures and combined signatures sent to the first validator computing device:

broadcasting, by the first validator computing device, the signatures and combined signatures to the validator computing devices of the distributed network;

determining, by each of the validator computing devices of the distributed network, whether the signature of the validator computing device is included in the signatures and combined signatures broadcast by the first validator computing device; and sending, by each of the validator computing devices that determines that its signature is not included in the signatures and combined signatures, the signature of the validator computing device to the first validator computing device.

4. The method of claim 1, further comprising:

determining a number of infractions for each of the validator computing devices in the distributed network;

removing a specified number of the validator computing devices with the highest number of infractions from the tree structure;

moving one or more validator computing devices that remain in the tree structure to empty positions in the tree structure created by the removing of the specified number of the validator computing devices form the tree structure, wherein the one or more validator computing devices are moved to the left; and inserting the removed validator computing devices into the tree structure at the right side of the tree structure.

5. The method of claim 4, wherein an infraction comprises disagreeing with a consensus on the validity of a candidate block.

6. The method of claim 4, wherein an infraction comprises sending a signature directly to the first validator computing device when the signature should have been combined with another signature to generate a combined signature.

7. The method of claim 4, wherein the infractions are determined over a sliding window of a specified number of previous candidate blocks.

8. The method of claim 4, wherein the infractions are weighted.

9. The method of claim 1, wherein the tree structure is a binary tree comprising the validator computing devices on the bottom level of the tree structure and virtual nodes on other levels of the tree structure.

10. A system comprising: one or more computers and one or more storage devices storing instructions which are operable, when executed by the one or more computers, to cause the one or more computers to perform operations comprising:

broadcasting, by a first of a plurality of validator computing devices of a distributed network to the rest of the plurality of validator computing devices, a candidate block;

determining, by the validator computing devices, whether the candidate block is valid or invalid;

generating, by each of the validator computing devices, a signature that indicates whether the validator computing device determined the block to be valid or invalid;

combining, by each one of the validator computing devices, the signature of the validator computing device with the signature of a validator computing device that is a sibling node of the one of the validator computing devices in a tree structure when the signature of the one of the validator computing devices and the signature of the validator computing device that is the sibling node agree, to generate combined signatures;

sending, by any validator computing device whose signature disagrees with the signature of a validator computing device that is its sibling node, the signature of the validator computing device to the first validator computing device;

removing, from the tree structure, at least one virtual node based on a disagreement between signatures between sibling validator computing devices, generating one or more independent subtree in the tree structure;

sending, by each of the validator computing devices that is the leftmost child node of a root node of each of the one or more independent subtrees, the combined signatures of the validator computing device to the first validator computing device; and determining a consensus on whether the candidate block is valid or not valid based on the signatures and combined signatures sent to the first validator computing device.

11. The system of claim 10, wherein the instructions further cause the one or more computers to perform operations comprising:

combining, by each one of the validator computing devices that operates a virtual node, the combined signatures generated by the validator computing device with the combined signatures generated by a validator computing device that is a operating a virtual node that is a sibling node of the virtual node operated by the one of the validator computing devices in the tree structure when the combined signatures generated by the one of the validator computing devices and the combined signatures generated by the validator computing device that is operating the virtual node that is the sibling node agree, to generate combined signatures; and sending, by any validator computing device operating a virtual node that generated combined signatures that disagree with the combined signatures of a validator computing device that is operating a virtual node that is a sibling node of the virtual node, the combined signatures generated by the validator computing device to the first validator computing device.

12. The system of claim 11, wherein the instructions further cause the one or more computers to perform operations comprising:
- broadcasting, by the first validator computing device, the signatures and combined signatures to the validator computing devices of the distributed network;
- determining, by each of the validator computing devices of the distributed network, whether the signature of the validator computing device is included in the signatures and combined signatures broadcast by the first validator computing device; and
- sending, by each of the validator computing devices that determines that its signature is not included in the signatures and combined signatures, the signature of the validator computing device to the first validator computing device.

13. The system of claim 12, wherein the instructions further cause the one or more computers to perform operations comprising:
- determining a number of infractions for each of the validator computing devices in the distributed network;
- removing a specified number of the validator computing devices with the highest number of infractions from the tree structure;
- moving one or more validator computing devices that remain in the tree structure to empty positions in the tree structure created by the removing of the specified number of the validator computing devices form the tree structure, wherein the one or more validator computing devices are moved to the left; and
- inserting the removed validator computing devices into the tree structure at the right side of the tree structure.

14. The system of claim 12, wherein an infraction comprises disagreeing with a consensus on the validity of a candidate block.

15. The system of claim 12, wherein an infraction comprises sending a signature directly to the first validator computing device when the signature should have been combined with another signature to generate a combined signature.

16. The system of claim 10, wherein the tree structure is a binary tree comprising the validator computing devices on the bottom level of the tree structure and virtual nodes on other levels of the tree structure.

* * * * *